(12) United States Patent
Ikeshima

(10) Patent No.: US 7,091,428 B2
(45) Date of Patent: Aug. 15, 2006

(54) WEIGHING APPARATUS WITH ROBERVAL MECHANISM

(75) Inventor: Masaru Ikeshima, Tokyo (JP)

(73) Assignee: Shinko Denshi Co., Ltd., Tokyo (JP)

( * ) Notice: Subject to any disclaimer, the term of this patent is extended or adjusted under 35 U.S.C. 154(b) by 140 days.

(21) Appl. No.: 10/875,370

(22) Filed: Jun. 24, 2004

(65) Prior Publication Data

US 2005/0284670 A1    Dec. 29, 2005

(51) Int. Cl.
*G01G 3/00* (2006.01)
*G01G 23/01* (2006.01)

(52) U.S. Cl. .......................... 177/229; 73/1.13; 73/1.15
(58) Field of Classification Search ............... 177/229, 177/50; 73/1.13, 1.15
See application file for complete search history.

(56) References Cited

U.S. PATENT DOCUMENTS

| | | | |
|---|---|---|---|
| 5,866,854 A * | 2/1999 | Emery et al. ................ | 177/50 |
| 6,194,672 B1 * | 2/2001 | Burkhard et al. ..... | 177/210 EM |
| 6,307,165 B1 * | 10/2001 | Komoto ..................... | 177/229 |
| 6,563,060 B1 * | 5/2003 | Komoto ................ | 177/210 EM |

FOREIGN PATENT DOCUMENTS

| | | |
|---|---|---|
| JP | 63-277936 A | 11/1988 |
| JP | 1-240830 A | 9/1989 |
| JP | 2000-283829 A | 10/2000 |

* cited by examiner

*Primary Examiner*—Randy W. Gibson
(74) *Attorney, Agent, or Firm*—Frishauf, Holtz, Goodman & Chick, P.C.

(57) ABSTRACT

A weighing apparatus for measuring a weight of an article including a Roberval mechanisms; a first load converting unit including a load receiving portion operationally coupled with a load receiving portion of the Roberval mechanism and a plurality of levers connected in series, a second load converting unit formed by a second Roberval mechanism whose load receiving portion is operationally coupled with the last lever of said first load converting unit, and a load sensor unit including a load receiving portion operationally coupled with the load receiving portion of the second load converting section and a load sensor coupled with said load receiving portion of the load sensor unit, wherein the load applied to said load receiving portion of the Roberval mechanism is enlarged or reduced by the levers of the second load converting section and a thus enlarged or reduced load is applied to the load sensor.

13 Claims, 4 Drawing Sheets

WEIGHING APPARATUS WITH ROBERVAL MECHANISM

BACKGROUND OF THE INVENTION

Field of the Invention

The present invention relates to a weighing apparatus comprising a Roberval mechanism including a base portion, a load receiving portion receiving a load to be measured and a pair of parallel link portions provided between the base portion and the load receiving portion via flexures, a load converting section including at least one lever having one end operationally coupled with said load receiving portion of the Roberval mechanism, and a load sensor operationally coupled with the other end of said lever, wherein the load applied to the load receiving portion of the Roberval mechanism is enlarged or reduced by the lever of the load converting section and a thus enlarged or reduced load is applied to the load sensor.

Weighing apparatuses for measuring a weight of an article with a load cell unit including a Roberval mechanism, a load converting section and a load sensor have been disclosed in Japanese Patent Application Laid-open Publications Kokai Sho 63-277936 and Kokai Hei 1-240830.

In these known weighing apparatuses, the load converting section including a lever for reducing a load to be applied to the load sensor is provided within the Roberval mechanism. However, in such weighing apparatuses, a freedom in designing the load converting section is limited. Furthermore, since the load converting section includes only one lever having a relatively small length, a sufficiently large ratio for enlarging or reducing a load could not be attained.

In Japanese Patent Application Laid-open Publication Kokai 2000-283829, there is disclosed another known weighing apparatus with a Roberval mechanism, a load converting section and a load sensor, in which the load converting section is provided as a separate body from the Roberval mechanism such that a lever of the load converting section is extended in a plane which is parallel with a plane of the Roberval mechanism. In such a weighing apparatus, although a freedom of design of the load converting section is enhanced, a longitudinal dimension of the load converting section is liable to be large and a whole weighing apparatus could not be made small and compact. Moreover, although a length of the lever of the load converting section can be longer, it is impossible to provide a plurality of levers, and therefore a load enlarging or reducing ratio could not be made sufficiently large.

SUMMARY OF THE INVENTION

The present invention has for object to provide a novel and useful weighing apparatus of a kind mentioned in the preamble, in which the above mentioned drawbacks of the known weighing apparatuses can be effectively removed by providing a load converting section as a separate unit from a Roberval mechanism, and a sufficiently high load enlarging or reducing ratio can be attained while the weighing apparatus can be small and compact.

In order to attain the aforesaid object, a weighing apparatus for measuring a weight of an article comprising:

a Roberval mechanisms having a base portion, a load receiving portion for receiving a load caused by an article to be measured and a pair of parallel link portions by means of which said base portion and load receiving portion are coupled with each other via flexures;

a load converting section including at least one lever and arranged in a plane which is different from a plane in which said Roberval mechanism is arranged, one end of said lever being operationally coupled with said load receiving portion of the Roberval mechanism; and a load sensor unit including a load receiving portion which is operationally coupled with the other end of said lever of the load converting section, and a load sensor coupled with said load receiving portion of the load sensor unit, wherein the load applied to said load receiving portion of the Roberval mechanism is enlarged or reduced by the lever of the load converting section and a thus enlarged or reduced load is applied to the load sensor.

In a preferable embodiment of the invention, said load converting section includes a first load converting unit having a plurality of levers coupled with each other in series, and a second load converting unit operationally coupled with the last lever of said first load converting unit, wherein said first load converting unit is provided in a plane perpendicular to the plane of the Roberval mechanism and said second load sensor is provided in a plane parallel to the plane of the Roberval mechanism. In such an embodiment, the second load converting unit may be formed as a Roberval mechanism and the load sensor unit may include a lever whose one end is operationally coupled with a load receiving portion of the Roberval mechanism of the second load converting unit, the other end of said lever of the load sensor unit being coupled with the load sensor.

DESCRIPTION OF THE PREFERRED EMBODIMENTS

Now the present invention will be explained in detail with reference to embodiments shown in the accompanying drawings.

Figure 1:
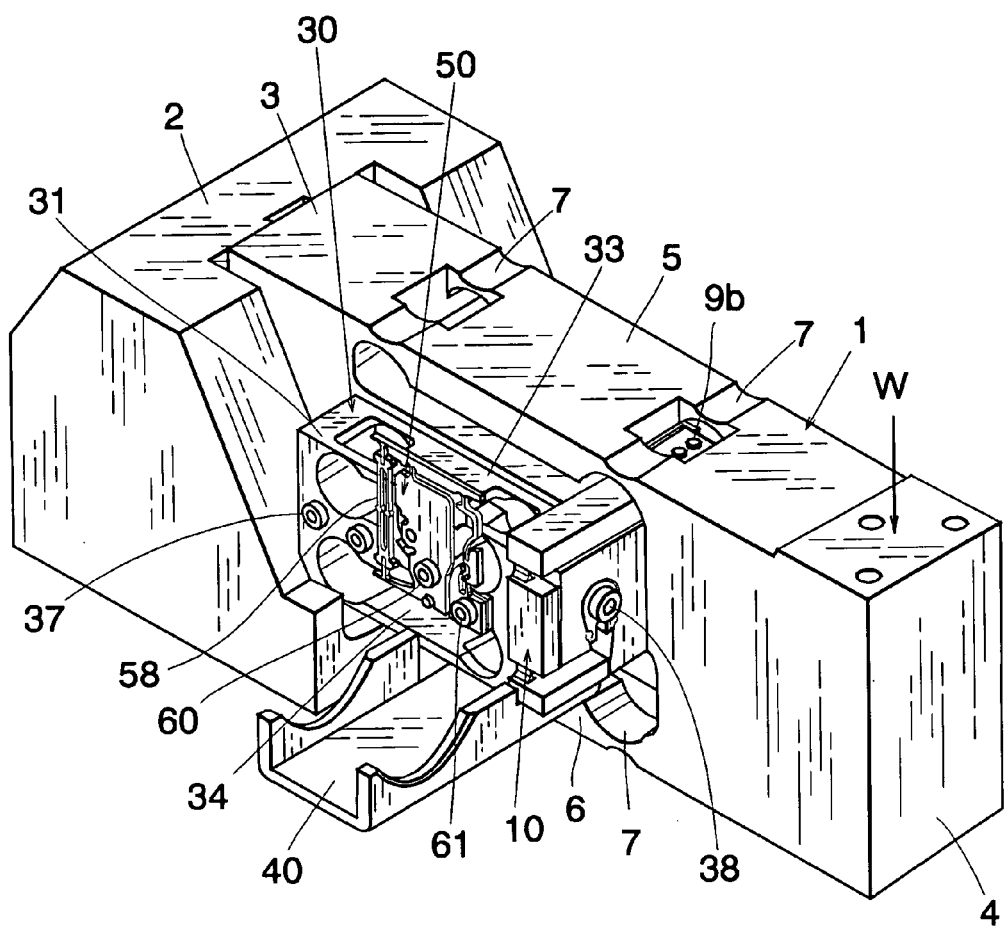
FIG. 1 is a perspective view showing an embodiment of the weighing apparatus according to the invention.
Figure 2:
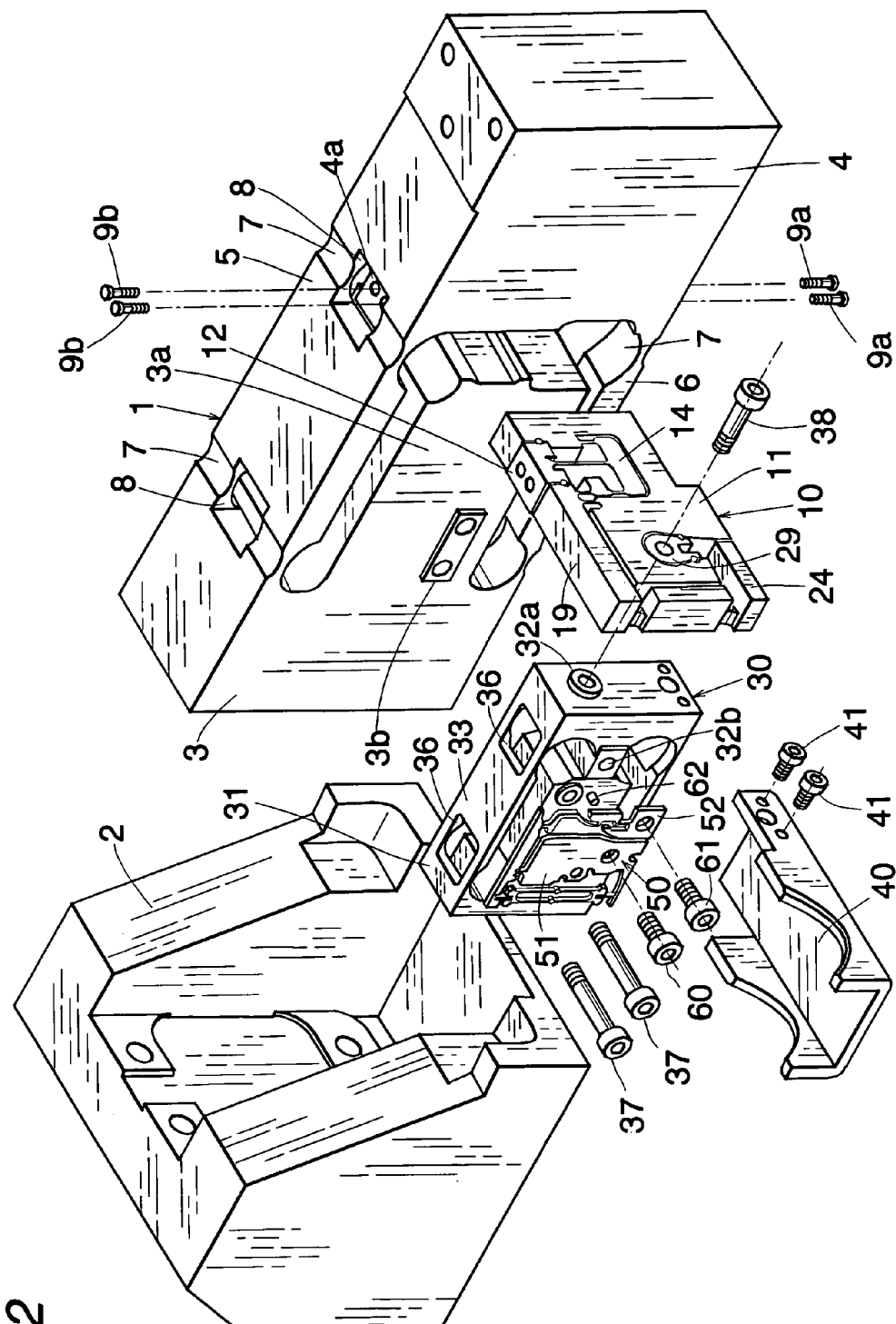
FIG. 2 is an exploded perspective view of the weighing apparatus.

FIG. 1 is a perspective view illustrating an embodiment of the weighing apparatus according to the present invention and FIG. 2 is an exploded perspective view thereof. The weighing apparatus comprises a Roberval mechanism 1 secured to a supporting member 2. The Roberval mechanism 1 is manufactured by cutting a single metal block into a given configuration. The Roberval mechanism 1 includes a base portion 3, a load receiving portion 4, upper and lower parallel link portions 5 ad 6, and four flexures 7, two of the four flexures being provided between the base portion 3 and the parallel link portions 5 and 6 and the remaining two flexures being provided between the load receiving portion 4 and the parallel link portions 5 and 6. Each of the flexures 7 has formed therein a through hole 8 such that an effective width of the flexure is narrowed. The Roberval mechanism 1 further comprises a fixing portion 3a which extends from the base portion 3 inwardly toward the load receiving portion 4.

To the base portion 3 of the Roberval mechanism 1 is secured a first load converting unit 10 such that the first load converting unit 10 extends in a plane which is perpendicular to a plane in which the Roberval mechanism 1 extends. To the first load converting unit 10 is secured a second load converting unit 30 which extends in a plane which is perpendicular to the plane of the first load converting unit 10 and is in parallel with the plane of the Roberval mechanism 1. To the second load converting unit 30 is secured a load sensor unit 50 including a tuning-fork type vibrating element.

A base portion 11 of the first load converting unit 10 is secured to the fixing portion 3a of the Roberval mechanism by means of lower bolts 9a shown in FIG. 2. The first load converting unit 10 is formed by piercing a metal block to have a number of cut-out portions and several levers. The fixing portion of the Roberval mechanism 1 has formed therein a projection extending toward the load receiving portion 4 and the above mentioned bolts 9a are secured to this projection.

Figure 3:
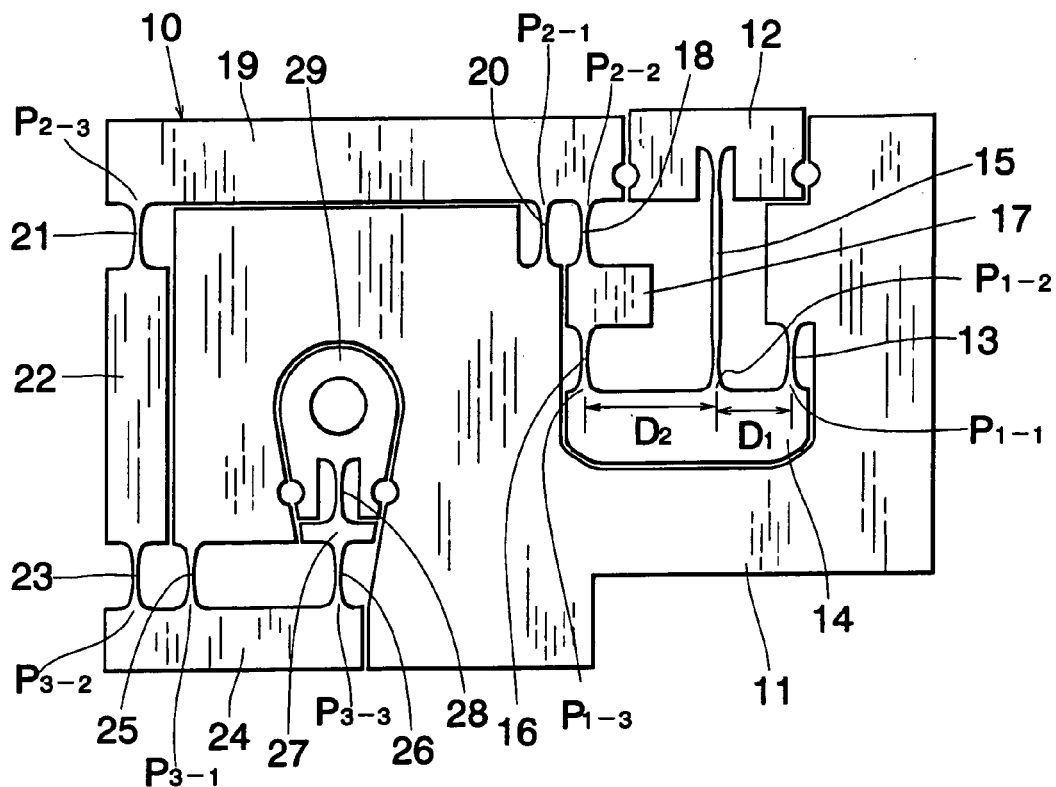
FIG. 3 is a front view of a first load converting unit.

The first load converting unit 10 includes a load receiving portion 12 which is coupled with the load receiving portion 4 of the Roberval mechanism 1 by means of upper bolts 9b shown in FIG. 2. To this end, the load receiving portion 4 of the Roberval mechanism 1 includes a projection 4a extending toward the fixing portion 3a and through holes. Screw holes are formed on a top surface of the load receiving portion 12 of the first load converting unit 10 and the bolts 9b are screwed into these screw holes through the through holes formed in the projection 4a to couple the load receiving portion 12 of the first load converting unit 10 to the load converting portion 4 of the Roberval mechanism 1. As illustrated in FIG. 3, the first load converting unit 10 further includes a first lever 14 whose one end is coupled with the base portion 11 via a flexure 13 serving as a fulcrum point $P_{1\text{-}1}$. A middle portion of the first lever 14 is coupled with the load receiving portion 12 via a connecting portion 15 such that said middle portion serves as a power point $P_{1\text{-}2}$. The other end of the first lever 14 serving as a point of action $P_{1\text{-}3}$ is coupled with one end of a second lever 19 by means of a flexure 16, a connecting portion 17 and a flexure 18. This end of the second lever 19 serves as a power point $P_{2\text{-}2}$. The second lever 19 is supported by the base portion 11 by means of a flexure 20 serving as a fulcrum point $P_{2\text{-}1}$. The other end of the second lever 19 is coupled with an upper end of a vertically extending connecting portion 22 via a flexure 21 serving as a point of action $P_{2\text{-}3}$.

A lower end of the connecting portion 22 is coupled with one end of a third lever 24 by means of a flexure 23 serving as a power point $P_{3\text{-}2}$. The third lever 24 is connected to the base portion 11 via a flexure 25 serving as a fulcrum point $P_{3\text{-}1}$, and the other end of the third lever 24 is coupled with a substantially circular connecting portion via a flexure 26 serving as a point of action $P_{3\text{-}3}$, a connecting portion 27 and a flexure 28.

It should be noted that the base portion 11, load receiving portion 12, first to third levers 14, 19, 24 have a thickness equal to a thickness of the metal block from which the first load converting unit 10 is formed, but some of the flexures 13, 16, 18, 20, 21, 23, 25, 26, 28 have a thickness smaller than a thickness of the metal plate.

Figure 4:
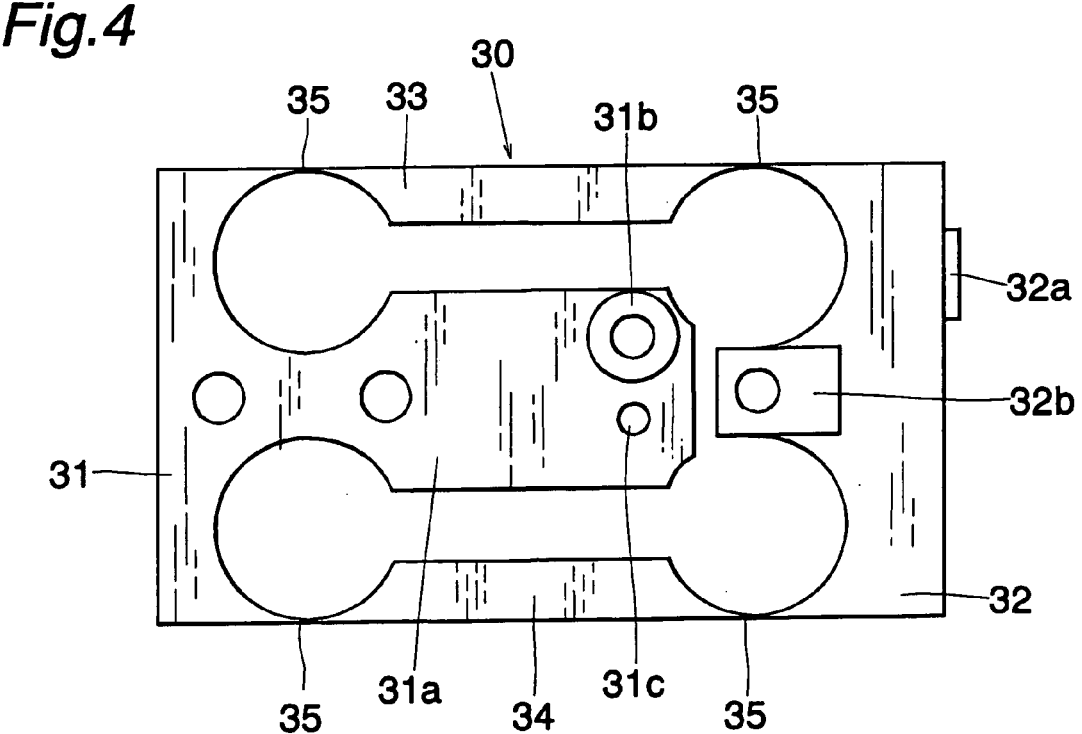
FIG. 4 is a front view of a second load converting unit.

FIG. 4 is a front view showing the second load converting unit 30. The second load converting unit 30 is also formed by piercing a single metal block to constitute a Roberval mechanism including a base portion 31, a load receiving portion 32, parallel link portions 33, 34 and four flexures 35. As illustrated in FIG. 2, each of the flexures 35 has formed therein a through hole 36 to reduce its effective thickness.

The base portion 31 of the second load converting unit 30 is secured to a side wall of the fitting portion 3a of the Roberval mechanism 1 by means of bolts 37 and a seat 3b secured to the side wall of the fitting portion 3a and having formed therein screw holes. On a front wall of the load receiving portion 32 of the second load converting unit 30, is provided a seat 32a having a screw hole formed therein, and the connecting portion 29 of the first load converting unit 10 is secured to the seat 32a by means of a bolt 38. The second load converting unit 30 further comprises a sensor fitting portion 31a to extend from the base portion 31 toward the load receiving portion 32 in a space formed between the upper and lower parallel link portions 33 and 34. On a side wall of the sensor fitting portion 31a; there are secured a seat 31b having a screw hole formed therein and a screw hole 31c into which a positioning pin 62 is screwed for positioning the sensor unit 50. On a side wall of the load receiving portion 32 of the second load converting unit 30, is secured a seat 32b having a screw hole formed therein for securing a load receiving portion of the load sensor unit 50 as will be explained later. Furthermore, to the load receiving portion 32 of the second load converting unit 30 is secured a weight receiving box 40 by means of bolts 41.

Figure 5:
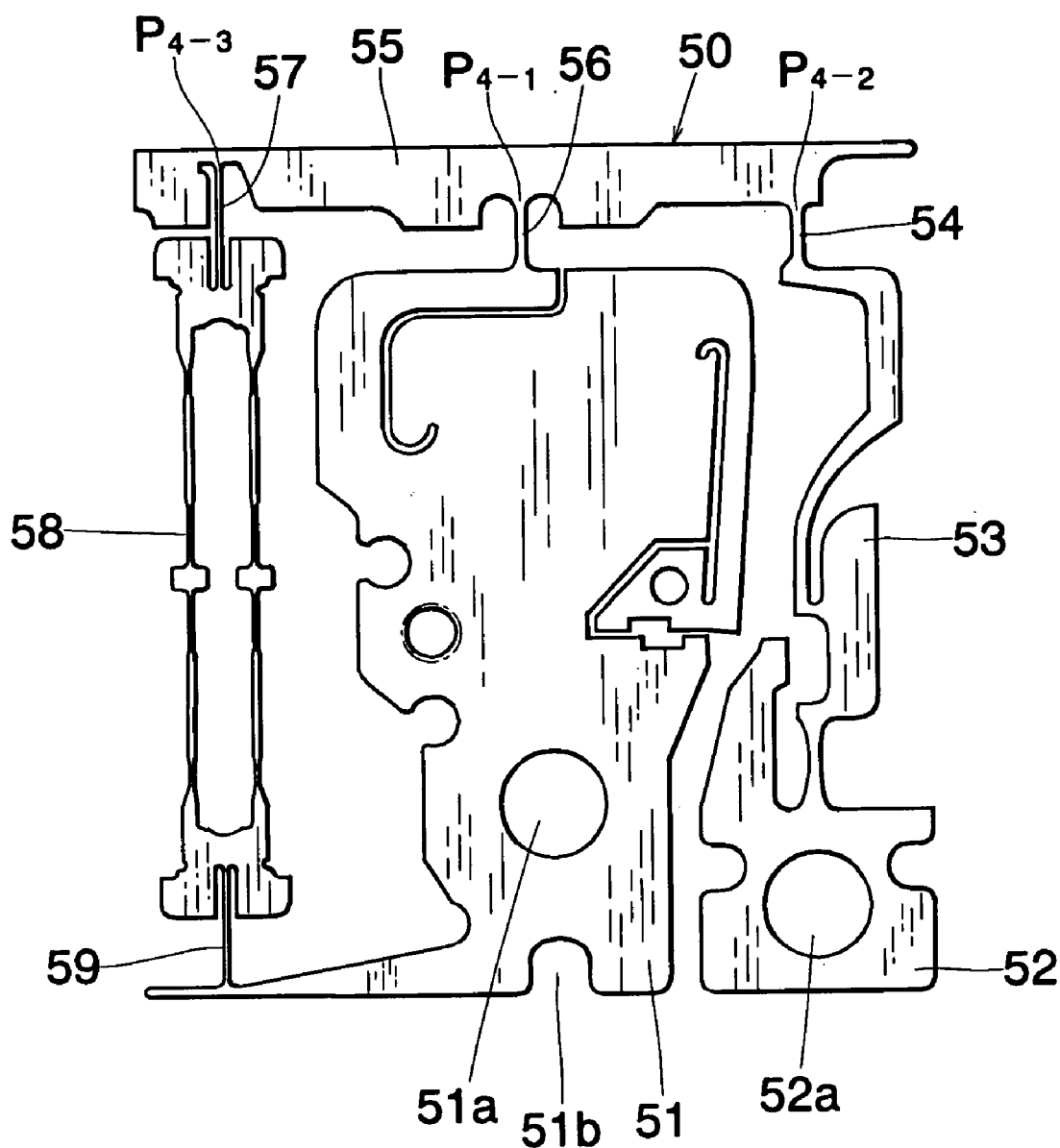
FIG. 5 is a front view showing a load sensor unit.

FIG. 5 is a front view of the load sensor unit 50. The load sensor unit 50 is formed by piecing a relatively thin metal plate. The load sensor unit 50 includes a base portion 51 and a load receiving portion 52. The base portion 51 is secured to the sensor fitting portion 31a of the second load converting unit 30 by screwing a bolt 60 into the screw hole formed in the seat 31b, and the load receiving portion 52 is secured to the load receiving portion 32 of the second load converting unit 30 by screwing a bolt 61 into the screw hole formed in the seat 32b. The base portion 51 of the load sensor unit 50 has formed therein a cut-out portion 51b through which the positioning pin 62 extends from the side wall of the sensor fitting portion 31a of the second load converting unit 30 to position the load sensor unit 50.

The load receiving portion 52 of the load sensor unit 50 is coupled with one end of a lever 55 by means of connecting portion 53 and a flexure 54 which serves as a power point $P_{4\text{-}2}$. The lever 55 is supported by the base portion 51 by means of a flexure 56 serving as a fulcrum point $P_{4\text{-}1}$, and the other end of the lever 55 is coupled with an upper end of a tuning fork 58 via a flexure 57 serving as a point of action $P_{4\text{-}3}$. A lower end of the tuning fork 58 is coupled with the base portion 51 by means of a flexure 59.

In the base portion 51 of the load sensor unit 50 there is formed a through hole 51a through which the bolt 60 passes, and in the load receiving portion 52 of the load sensor unit 50 there is formed a through hole 52a through which the bolt 61 passes.

Upon measuring a weight of an article, the article is placed on an article receiving pan (not shown in the drawings) secured to the load receiving portion 4 of the Roberval mechanism 1, and then a load W is applied to the load receiving portion 4 and the load receiving portion descends. Since the load receiving portion 4 is constructed in the Roberval mechanism 1, even though the load receiving portion 4 moves downward, the parallelogram formed by the base portion 3, load receiving portion 4 and parallel link portions 5, 6 is maintained.

The load W applied to the load receiving portion 4 of the Roberval mechanism 1 is transferred to the load receiving portion 12 of the first load converting unit 10 and is further transferred to the power point $P_{1\text{-}2}$ of the first lever 14. The load W is reduced to a value which is proportional to a ratio of a distance $D_1$ between the fulcrum point $P_{1\text{-}1}$ and the power point $P_{1\text{-}2}$ and a distance $D_2$ between the fulcrum point $P_{1\text{-}2}$ and the point of action $P_{1\text{-}3}$. In the present embodiment, the distance $D_2$ is longer than the distance $D_1$ by about three times, and therefore the load W is reduced to a third thereof. The thus reduced load is transferred to the power point $P_{2-2}$ of the second lever 19 via the connecting portion 17. The load is further reduced by the lever 19 to a value proportional to a ratio of a distance between the fulcrum point $P_{2-1}$ and the power point $P_{2-2}$ and a distance between the fulcrum point $P_{2-1}$ and the point of action $P_{2-3}$. The reduced load is further transferred via the connecting portion 22 to the third lever 24. In the third lever 24, the load is further reduced to a value which is proportional to a ratio of a distance between the fulcrum point $P_{3-1}$ and the power point $P_{3-2}$ and a distance between the fulcrum point $P_{3-1}$ and the point of action $P_{3-3}$. The thus reduced load is applied to the connecting portion 29 via the connecting portion 27.

The load applied to the connecting portion 29 is transferred to the load receiving portion 32 of the second load converting unit 30 by means of the bolt 38. Therefore, the load receiving portion 32 of the second load converting unit 30 descends downward, while the parallelogram formed by the base portion 31, load receiving portion 32 and parallel link portions 33, 34 is maintained.

The load applied to the load receiving portion 32 of the second load converting unit 30 is then transferred to the load receiving portion 52 of the load sensor unit, and is further transferred to the lever 55 via the connecting portion 53. In the lever 55, the load is reduced to a value proportional to a ratio of a distance between the fulcrum point $P_{4-1}$ and the power point $P_{4-2}$ and a distance between the fulcrum point $P_{4-1}$ and the point of action $P_{4-3}$. Then the finally reduced load is applied to the tuning fork 58 as a pulling force and a frequency of the tuning fork 58 is changed. By detecting this frequency change of the tuning fork 58, it is possible to measure the original load W, i.e. a weight of the article.

In this manner, the original load W is reduced by the first, second and third levers 14, 19 and 24 of the first load converting unit 10, and the thus reduced load is further reduced by the lever 55 of the load sensor unit 50. In the present embodiment, the original load W is reduced by about 70 times. According to the invention, since the first load converting unit 10 including the levers is arranged outside the Roberval mechanism 1 such that the levers 14, 19 and 24 extend in a plane perpendicular to a plane in which the Roberval mechanism 1 extends, the weighing apparatus can be made small and compact, while the load applied to the load sensor, i.e. the tuning fork 58 can be reduced with a sufficient large ratio and a measurable range can be increased In the present embodiment, by placing a standard weight on the weight placing box 40, a load is applied to the load receiving portion 32 of the second load converting unit 30 and the load sensor unit 50 can be calibrated. The Roberval mechanism 1, first and second load converting units 10 and 30 and load sensor unit 50 is provided within a housing. Since the standard weight is automatically placed on the weight placing box 40 by means of a driving motor, the calibration can be performed merely by operating a calibration button. It should be noted that the load is sufficiently reduced by the first load converting unit 10, the standard weight having a small weight can be used.

In the above embodiment, the Roberval mechanism 1 and first and second load converting units 10, 30 and the load sensor unit 50 are formed by piercing the metal blocks and the metal plate, respectively. However, according to the invention, these members may be formed by composing a plurality of parts.

Moreover, in the above embodiment, the first load converting unit 10 includes the three levers 14, 19 and 24, but according to the invention, the load converting unit may have one or two or more than three levers. Furthermore, in the above embodiment, the load converting section is composed of the first and second load converting units 10 and 30, but according to the invention, only the first load converting unit including at least one lever may be provided. In this case, the load sensor unit 50 may be provided on the first load converting unit 10. In the above embodiment, the load sensor unit 50 includes the lever 55, but the load sensor unit may not have any lever.

In the above embodiment, the load is reduced by setting a distance between the fulcrum point and the power point smaller than a distance between the fulcrum point and the point of action. It should be noted that according to the invention, the load may be enlarged by suitably setting the above distances.

As explained above, the weighing apparatus according to this invention, by providing the load converting mechanism outside the Roberval mechanism, the load can be reduced or enlarged with a sufficiently large ratio without decreasing a mechanical strength of the Roberval mechanism. Therefore, the load sensor may be small and a measurable range can be increased.

What is claimed is:

1. A weighing apparatus for measuring a weight of an article, said apparatus comprising:
   a Roberval mechanism including a base portion, a load receiving portion and a pair of parallel link portions which couple said base portion and load receiving portion to each other via flexures;
   a load converting section which includes at least one lever having a first end that is operationally coupled with the load receiving portion of the Roberval mechanism, and which is arranged in a plane that is different from a plane in which said Roberval mechanism is arranged; and
   a load sensor unit including a base portion, a load receiving portion which is operationally coupled with a second end of said lever of the load converting section, and a load sensor coupled with said load receiving portion of the load sensor unit, wherein a load applied to said load receiving portion of the Roberval mechanism is enlarged or reduced by the lever of the load converting section such that an enlarged or reduced load is applied to the load sensor.

2. The weighing apparatus according to claim 1, wherein said load converting section comprises a load converting unit including a plurality of levers.

3. The weighing apparatus according to claim 2, wherein said load converting unit extends in a plane perpendicular to the plane in which the Roberval mechanism is arranged.

4. The weighing apparatus according to claim 3, wherein the Roberval mechanism includes a fitting portion which extends from the base portion toward the load receiving portion within a space formed between the pair of parallel link portions, and said load converting unit is secured to said fitting portion of the Roberval mechanism.

5. The weighing apparatus according to claim 1, wherein said load converting section comprises:
   a first load converting unit including a base portion, a load receiving portion operationally coupled with the load receiving portion of the Roberval mechanism, a first lever having a first end that is connected to said load receiving portion of the first load converting unit, a second lever having a first end that is connected to a second end of said first lever, a third lever having a first end that is connected to a second end of said second lever, and a connecting portion which is connected to a second end of said third lever; and a second load converting unit formed by a second Roberval mechanism including a base portion, a load receiving portion operationally coupled with said connecting portion of the first load converting unit, and a pair of parallel link portions provided between the base portion and the load receiving portion via flexures, wherein said load receiving portion of the second Roberval mechanism of the second load converting unit is connected to said load receiving portion of the load sensor unit.

6. The weighing apparatus according to claim 5, wherein said first load converting unit is arranged in a plane perpendicular to the plane of the Roberval mechanism and said second load converting unit is arranged in a plane which is perpendicular to the plane of the first load converting unit and is parallel to the plane of the Roberval mechanism.

7. The weighing apparatus according to claim 6, wherein the Roberval mechanism includes a fitting portion which extends from the base portion toward the load receiving portion within a space formed between the pair of parallel link portions, and said base portion of the first load converting unit is secured to said fitting portion of the Roberval mechanism.

8. The weighing apparatus according to claim 7, wherein the said second Roberval mechanism of the second load converting unit includes a sensor fitting portion which extends from the base portion toward the load receiving portion within a space formed between the pair of parallel link portions, and said base portion of the load sensor unit is secured to said sensor fitting portion of the second Roberval mechanism of the second load converting unit.

9. The weighing apparatus according to claim 8, wherein said load sensor unit includes a lever having a first end connected to said load receiving portion of the load sensor unit and a second end connected to said load sensor.

10. The weighing apparatus according to claim 5, wherein said Roberval mechanism is formed by piercing a metal block.

11. The weighing apparatus according to claim 10, wherein each of said first and second load converting units is formed by piercing a metal block.

12. The weighing apparatus according to claim 11, wherein said load sensor unit is formed by piercing a metal plate.

13. The weighing apparatus according to claim 5, wherein a weight box for placing a standard weight is secured to said load receiving portion of the load sensor unit.

* * * * *